(No Model.) 2 Sheets—Sheet 1.
I. R. STEWART.
HAY PRESS.
No. 596,129. Patented Dec. 28, 1897.
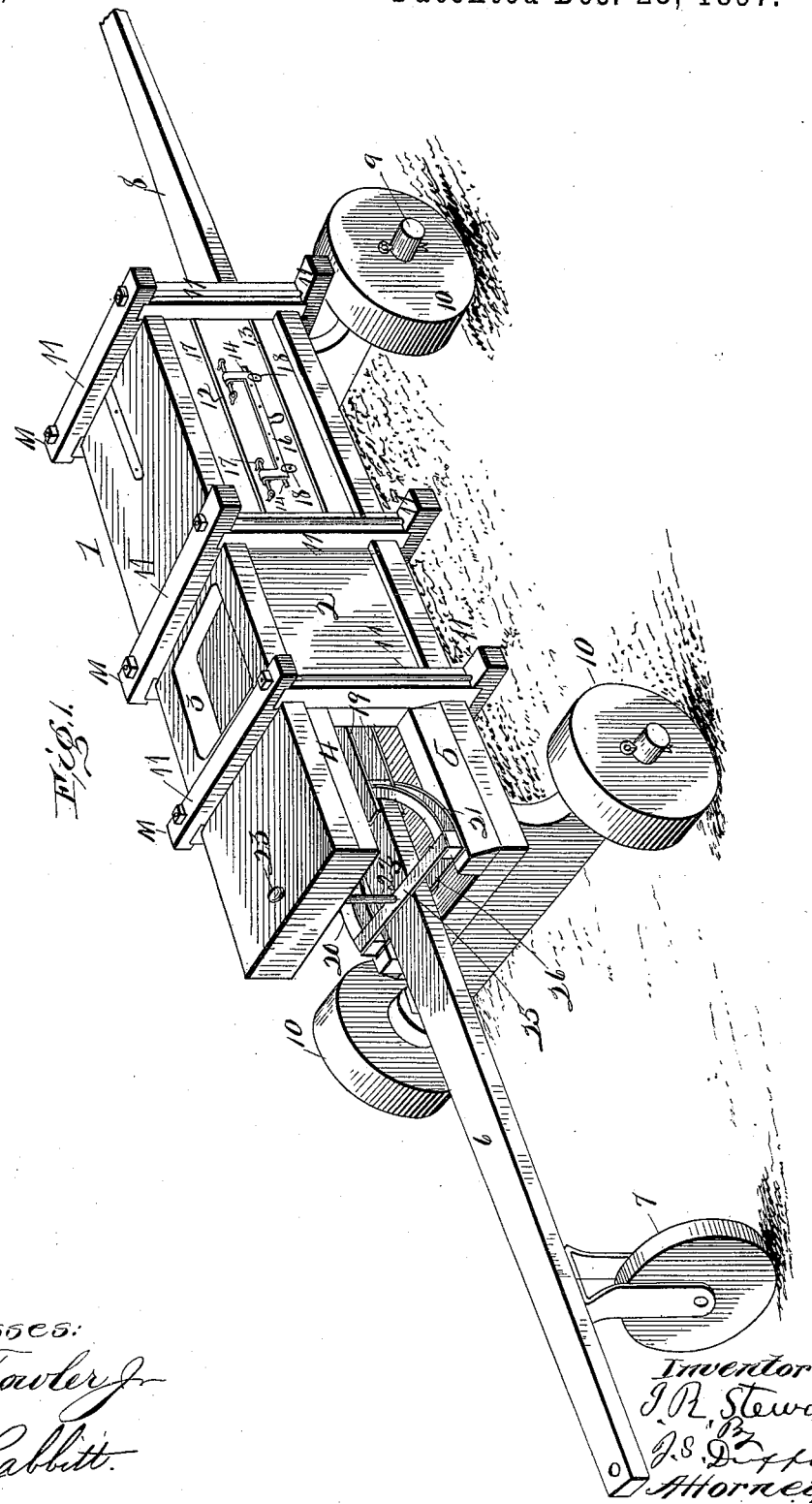
Witnesses:
J. M. Fowler Jr.
R. E. Rabbitt.
Inventor
I. R. Stewart
J. S. Diffie
Attorney (No Model.) 2 Sheets—Sheet 2.
I. R. STEWART.
HAY PRESS.
No. 596,129. Patented Dec. 28, 1897.
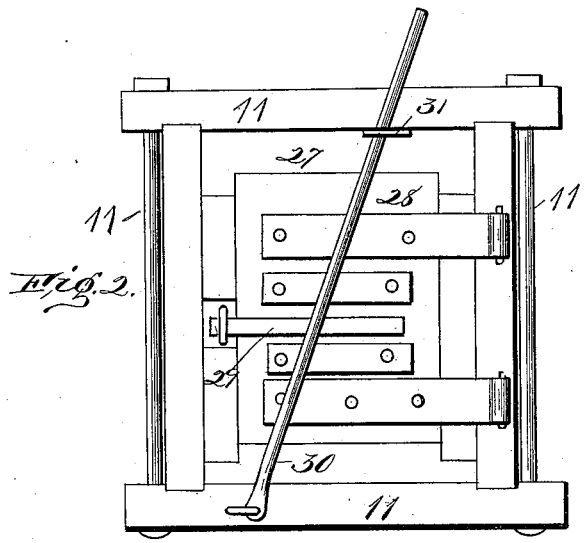
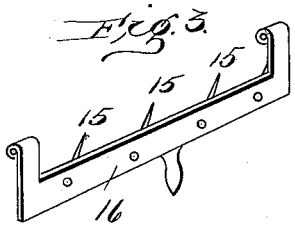
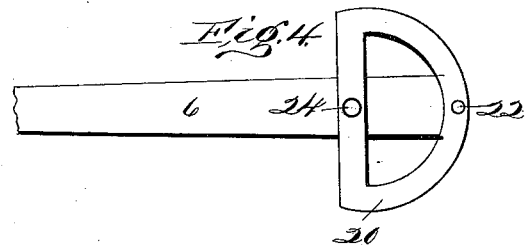
Witnesses.
J. M. Fowler Jr.
R. E. Rabbitt.
Inventor
I. R. Stewart
By J. S. Dipple
Attorney

UNITED STATES PATENT OFFICE.

ISAAC RITCHEARD STEWART, OF HOPE, ARKANSAS.

HAY-PRESS.

SPECIFICATION forming part of Letters Patent No. 596,129, dated December 28, 1897.

Application filed August 15, 1896. Serial No. 602,895. (No model.)

*To all whom it may concern:*

Be it known that I, ISAAC RITCHEARD STEWART, a citizen of the United States, residing at Hope, in the county of Hempstead and State of Arkansas, have invented certain new and useful Improvements in Hay-Presses; and I do hereby declare the following to be a full, clear, and exact description of the invention, such as will enable others skilled in the art to which it appertains to make and use the same.

My invention is primarily a hay-press, but may be used for baling such other material as may be so baled; and it consists in the novel construction and arrangement of its parts, hereinafter set out in this specification and the claims hereunto attached.

In the accompanying drawings, Figure 1 is a perspective view of my invention. Fig. 2 is a front end view, or the end from which the bale is ejected. Fig. 3 is a perspective view of the securer and frame. Fig. 4 is a top plan view of the lever and guides, the extended end of the lever being broken off.

My invention is described as follows:

1 is the baling-box.

2 is that part of the box where the hay is first received.

3 is the opening through which the hay is passed into part 2.

4 and 5 are extensions between which the lever 6 is pivoted.

7 is a wheel for bearing up the extreme end of the lever.

8 is the tongue secured to the axle 9 and is used when the press is being removed from place to place.

10 are the wheels.

The wheels and axles, however, may be made in any approved and convenient shape.

The box 1 is securely held together by proper clamps 11. Inside of the box 1 is operated a plunger, which, however, is not shown in the drawings. No description of the plunger, however, is deemed necessary, as any suitable plunger adapted to be used in my press will answer.

In each side of the baling part of the box are slots 12 and 13, through which the baling-wires are inserted, and between these slots and on each side of the box are shorter slots 14, through which the retainers 15 enter into the box and extend beyond the inner face of the walls and prevent the hay from bulging back after it has been crowded to the front end of the box. These retainers are secured in a frame 16, which is hinged to the box by means of hinges 17. This frame 16 is held in place by means of buttons 18. It will be seen that this frame can be raised at any time and may at any time be shut down and secured by the buttons 18. After the hay has been put in and the plunger started forward it is necessary to raise the frame 16 and thus withdraw the retainers, so that they will not be in the way of the plunger.

To the rear end of the plunger are bolted two plates 19, their front ends being pivoted to the upper and lower faces of the guides 20 and 21 and through the free and rear end of the lever 6 and perforation 22. (See Fig. 4.) The lever 6 is pivoted between the front ends of the extensions 4 and 5 by a bolt 23, passing through perforation 24. (See Fig. 4.) The guides 20 and 21 are respectively secured to the upper and lower faces of the lever 6, their ends being braced and held together by the cross-pieces 25 and 26. These guides 20 and 21 are half-circles and hold the lever steadily in place as it is turned from the right to the left or from the left to the right and prevent its free end, where it is pivoted to the plates 19, from catching against the upper or lower walls of the bearings 4 and 5.

27 is the rear end of the press-box. 28 is the door hinged to said box and held in place when shut by the latch 29, bar 30, and catch 31.

Having described my invention, what I claim as new, and desire to secure by Letters Patent, is—

1. The combination of the baling-box 1, having in either side longitudinal slots 14; frames 16, one hinged to each side of the box; retainers 15, secured to the frame 16, their free ends pointing slightly rearward, passing through said slots 14, and adapted to hold the compressed material, and means for holding said frame 16, in operative position, substantially as shown and described and for the purposes set forth.

2. A baling-press, consisting of the baling-box 1; extensions 4 and 5, secured to the front end of said box; operating-lever 6, pivoted between said extensions, a plunger in the box and operated by said lever; guides 20 and 21, secured to the upper and lower faces of the lever to steady the movement thereof, and braces 25 and 26, securing said guides in place, substantially as shown and described and for the purposes set forth.

In testimony whereof I affix my signature in presence of witnesses.

ISAAC RITCHEARD STEWART.

Witnesses:
S. H. BRIANT,
F. D. REED,
A. L. BLACK,
G. W. WIGGINS,
ISAAC MOUSER,
L. P. WIGGINS.